(12) United States Patent
Asveren

(10) Patent No.: US 9,553,792 B2
(45) Date of Patent: *Jan. 24, 2017

(54) SECURE MEDIA ADDRESS LEARNING FOR ENDPOINTS BEHIND NAPT DEVICES

(71) Applicant: Sonus Networks, Inc., Westford, MA (US)

(72) Inventor: Tolga Asveren, Bordentown, NJ (US)

(73) Assignee: SONUS NETWORKS, INC., Westford, MA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/615,154

(22) Filed: Feb. 5, 2015

(65) Prior Publication Data
US 2015/0156104 A1 Jun. 4, 2015

Related U.S. Application Data

(63) Continuation of application No. 13/372,738, filed on Feb. 14, 2012, now Pat. No. 8,984,110.

(51) Int. Cl.
*H04L 12/751* (2013.01)
*H04L 29/12* (2006.01)
*H04L 29/06* (2006.01)
*H04W 12/06* (2009.01)

(52) U.S. Cl.
CPC ........... *H04L 45/08* (2013.01); *H04L 61/2007* (2013.01); *H04L 61/2517* (2013.01); *H04L 61/6077* (2013.01); *H04L 63/029* (2013.01); *H04L 65/1006* (2013.01); *H04L 65/1083* (2013.01); *H04L 29/125* (2013.01); *H04L 29/1233* (2013.01); *H04L 29/12424* (2013.01); *H04L 61/20* (2013.01); *H04L 61/25* (2013.01); *H04L 61/256* (2013.01); *H04L 61/2514* (2013.01); *H04L 61/2557* (2013.01);
(Continued)

(58) Field of Classification Search
CPC combination set(s) only.
See application file for complete search history.

(56) References Cited

U.S. PATENT DOCUMENTS 6,957,346 B1 * 10/2005 Kivinen .............. H04L 12/4633 713/153
7,406,709 B2 * 7/2008 Maher, III ........ H04L 29/12471 709/226

(Continued)

*Primary Examiner* — Saket K Daftuar
(74) *Attorney, Agent, or Firm* — Stephen T. Straub; Ronald P. Straub; Michael P. Straub

(57) ABSTRACT

A first media packet from a first endpoint of an access network behind a NAPT device is received by a media device between a core network and the access network. The first media packet includes a first source IP address and port combination identifying the first endpoint. An UPDATE request or a reINVITE request is transmitted by the media device. A second IP address and port combination for the media device to receive future media packets from the first endpoint is negotiated. The media device compares a first IP address of the first source IP address and port combination to a second IP address of a second source address and port combination for a second media packet received on the second IP address and port combination. If the first and second IP addresses match, the media device relays media packets from the core network to the first endpoint.

20 Claims, 3 Drawing Sheets

(52) U.S. Cl.
CPC ...... *H04L 63/0807* (2013.01); *H04L 65/1069* (2013.01); *H04W 12/06* (2013.01)

(56) References Cited

U.S. PATENT DOCUMENTS

| | | | | |
|---|---|---|---|---|
| 7,706,401 B2* | 4/2010 | Bae | H04L 12/6418 | 370/352 |
| 8,228,942 B2* | 7/2012 | Mo | H04L 29/12358 | 370/389 |
| 8,346,962 B2* | 1/2013 | Lee | H04L 29/06027 | 709/238 |
| 8,392,583 B2* | 3/2013 | Bijwaard | H04N 21/6405 | 709/227 |
| 2005/0286553 A1* | 12/2005 | Wetterwald | H04L 29/12009 | 370/466 |
| 2007/0036143 A1* | 2/2007 | Alt | H04L 12/6418 | 370/352 |
| 2007/0297430 A1* | 12/2007 | Nykanen | H04L 63/029 | 370/408 |
| 2008/0005290 A1* | 1/2008 | Nykanen | H04L 63/029 | 709/222 |
| 2008/0075114 A1* | 3/2008 | Mo | H04L 29/12358 | 370/466 |
| 2008/0080519 A1* | 4/2008 | Park | H04L 29/12066 | 370/395.54 |
| 2009/0180476 A1* | 7/2009 | Lee | H04L 29/06027 | 370/392 |
| 2010/0098093 A1* | 4/2010 | Ejzak | H04L 61/2546 | 370/401 |
| 2010/0211689 A1* | 8/2010 | Bijwaard | H04N 21/6405 | 709/228 |
| 2011/0035501 A1* | 2/2011 | Takeda | H04L 29/12528 | 709/227 |
| 2011/0191493 A1* | 8/2011 | Lee | H04L 29/06027 | 709/238 |
| 2011/0264909 A1* | 10/2011 | Ejzak | H04L 61/2546 | 713/153 |
| 2011/0317705 A1* | 12/2011 | Takeda | H04L 29/12528 | 370/392 |
| 2012/0011234 A1* | 1/2012 | Xu | H04L 29/12358 | 709/221 |
| 2012/0027008 A1* | 2/2012 | Chou | H04L 45/00 | 370/352 |
| 2012/0044930 A1* | 2/2012 | Ajero | H04L 12/66 | 370/352 |
| 2012/0047273 A1* | 2/2012 | Ajero | H04L 12/2801 | 709/228 |
| 2012/0096176 A1* | 4/2012 | Kiss | H04L 29/125 | 709/228 |
| 2012/0155454 A1* | 6/2012 | Eichen | H04L 12/66 | 370/352 |
| 2013/0159754 A1* | 6/2013 | Wendt | H04L 12/10 | 713/330 |

* cited by examiner

SECURE MEDIA ADDRESS LEARNING FOR ENDPOINTS BEHIND NAPT DEVICES

RELATED APPLICATION

The present application is a continuation of U.S. patent application Ser. No. 13/372,738 filed Feb. 14, 2012 which is hereby expressly incorporated by reference in its entirety.

FIELD OF THE INVENTION

The invention relates generally to secure media address learning for endpoints behind Network Access and Port Translation (NAPT) devices, and more particularly to triggering a session renegotiation, by a media device, using an UPDATE request or a reINVITE request to change the IP address and port combination over which the media device receives traffic from a NAPT device.

BACKGROUND

NAPT devices, in general, do not allow unknown traffic flows to be initiated from the core network side. The first message, typically, is sent to the core network by an endpoint behind the NAPT device on the access network. This creates a new binding on the NAPT device. This behavior creates difficulties for media streams to be sent to devices behind NAPT devices as the IP address and port combination inserted into the signaling message(s) is not the IP address and port combination to be used when sending media packets to such endpoints. To overcome this problem, media address learning can be used.

The first-hop media entity in the core network or public domain from the endpoint perspective sends media packets to the endpoint only after it receives a first media packet from the endpoint. After that first media packet, the first-hop media entity sends media packets to the source IP address and port combination of the first media packet received from the endpoint.

A problem with media address learning is security. The first-hop media entity uses the source IP address and port of the first packet received on the port allocated for this session, but there is no guarantee that the packet is really sent by the endpoint behind the NAPT device. An attacker can continuously send packets to media ports of the first-hop media device and cause media traffic not to be received by the endpoint.

SUMMARY OF THE INVENTION

To thwart attackers, a media device can, and in some embodiments does, trigger a session renegotiation using an UPDATE request or a reINVITE request. The media device may be, e.g., a first hop media device such as a session boarder controller. The media device can, and in some embodiments does, change the IP address and port combination over which it receives traffic from an endpoint behind a NAPT device. The endpoint knows the new IP address and port combination but in the case of secure signaling communications, not other devices. If an attacker sends traffic to the original IP address and port combination for a session, after it had been changed, the media device is able to detect the use of the outdated address and port combination and disregard or take another action with regard to packets identified as corresponding to the session but which use the outdated address and port combination. By utilizing an UPDATE request and/or a reINVITE request one or multiple times during a session, a media device in accordance with the invention reduces or eliminates risks associated with a potential security problem without having to rely on any special behavior/support for non-common procedures or protocols. In some but not necessarily all embodiments, the first hop media device is a session border controller. The end user device may be any one of a wide variety of devices capable of support a user session, e.g., an audio, video or multimedia session. The end user device may, and sometimes is, located at a customer premise location, e.g., a home or business location. The media device may be located at a separate physical location from the location of the endpoint, e.g., end user device. The endpoint maybe, for example, a user device such as a personal computer, notebook computer, PDA, etc., which is an endpoint of a user session.

In one aspect, there is a method including receiving, by a media device between a core network and an access network, on a first IP address and port combination of the media device, during a user session, a first media packet from a first endpoint of the access network behind a NAPT device of the access network. The first media packet includes a first source IP address and port combination identifying the first endpoint. The media device transmits an UPDATE request or a reINVITE request (e.g., to the NAPT device). A second IP address and port combination for the media device to receive future media packets from the first endpoint is negotiated during the user session. The media device receives, on the second IP address and port combination of the media device, during the user session, a second media packet from a second endpoint. The second media packet includes a second source IP address and port combination identifying the second endpoint. The media device compares a first IP address of the first source IP address and port combination for the first media packet received on the first IP address and port combination to a second IP address of the second source IP address and port combination for the second media packet received on the second IP address and port combination. If the first IP address matches the second IP address, the media device treats the user session as secure and relays media packets from the core network to the first endpoint on the access network using the second source IP address and port combination. The first media packet may, and in some embodiments is, one of a first group of packets received by the media device on the media IP address and port advertised during a previous, e.g., the first, session negotiation for the session, e.g., call, by the media device. Similarly, the second packet may, and in some embodiments is, a media packet in a second group of media packets received by said media device on an IP address, e.g., media IP address, and port advertised during a non-first session negotiation for the session, e.g., call. In such a case the call may be implemented as a audio media session.

In another aspect, there is a system including a media device between a core network and an access network. The media device is configured to receive, during a user session, a first media packet from a first endpoint of the access network behind a NAPT device of the access network. The first media packet includes a first source IP address and port combination identifying the first endpoint. The media device transmits an UPDATE request or a reINVITE request (e.g., to the NAPT device). A second IP address and port combination for the media device to receive future media packets from the first endpoint is negotiated during the user session. The media device receives, on the second IP address and port combination of the media device, during the user session, a second media packet from a second endpoint. The second media packet includes a second source IP address and port combination identifying the second endpoint. The media device compares a first IP address of the first source IP address and port combination for the first media packet received on the first IP address and port combination to a second IP address of the second source IP address and port combination for the second media packet received on the second IP address and port combination. If the first IP address matches the second IP address, the media device treats the user session as secure and relays media packets from the core network to the first endpoint on the access network using the second source IP address and port combination.

In yet another aspect, there is a computer program product, tangibly embodied in a computer readable storage device of a media device between a core network and an access network. The computer program product includes instructions operable to cause a data processing apparatus to receive, during a user session, a first media packet from a first endpoint of the access network behind a NAPT device of the access network. The first media packet includes a first source IP address and port combination identifying the first endpoint. The computer program product further includes instructions operable to cause the data processing apparatus to transmit an UPDATE request or a reINVITE request and negotiate, during the user session, a second IP address and port combination for the media device to receive future media packets from the first endpoint. The computer program product further includes instructions operable to cause the data processing apparatus to receive, on the second IP address and port combination, during the user session, a second media packet from a second endpoint. The second media packet has a second source IP address and port combination identifying the second endpoint. The computer program product includes instructions operable to cause the data processing apparatus to compare a first IP address of the first source IP address and port combination for the first media packet received on the first IP address and port combination to a second IP address of the second source address and port combination for the second media packet received on the second IP address and port combination. If the first IP address matches the second IP address, the media device treats the user session as secure and relays media packets from the core network to the first endpoint on the access network using the second source IP address and port combination.

In still another aspect, there is a system including means for receiving, on a first IP address and port combination of a media device, during a user session, a first media packet from a first endpoint of the access network behind a NAPT device of the access network. The first media packet includes a first source IP address and port combination identifying the first endpoint. The system includes means for transmitting an UPDATE request or a reINVITE request, and means for negotiating, during the user session, a second IP address and port combination for the media device to receive future media packets from the first endpoint. The system further includes means for receiving, on the second IP address and port combination of the media device, during the user session, a second media packet from a second endpoint. The second media packet includes a second source IP address and port combination identifying the second endpoint. The system includes means for comparing a first IP address of the first source IP address and port combination for the first media packet received on the first IP address and port combination to a second IP address of the second source address and port combination for the second media packet received on the second IP address and port combination. The system further includes means for relaying media packets from the core network to the first endpoint on the access network using the second source IP address and port combination if the first IP address matches the second IP address.

In other examples, any of the aspects above, or any apparatus, system or device, or method, process or technique, described herein, can include one or more of the following features.

The UPDATE request or the reINVITE request can include the second IP address and port combination. Treating the user session as secure can include identifying the first endpoint and the second endpoint as the same endpoint because the first IP address matches the second IP address. The first source IP address and port combination of the first media packet can be an IP address and port combination assigned to the first endpoint by the NAPT device (e.g., the NAPT device can overwrite the source IP address and port combination of the media packet).

In various embodiments, the first media packet is one media packet of a first plurality of media packets received on the first IP/port combination, and the second media packet is one media packet of a second plurality of media packets received on the second IP/port combination. Receipt of the first plurality of media packets occurs during phase one, and receipt of the second plurality of media packets occurs during phase two. Comparison is between source addresses of media packets received during phase one and source addresses of media packets received during phase two.

In various embodiments, if the first IP address does not match the second IP address, the media device can determine if the same configurable IPv4/IPv6 subnet value is present in the first media packet and the second media packet. If the same configurable IPv4/IPv6 subnet value is present in the first media packet and the second media packet, the media device relays media packets from the core network to the first endpoint on the access network using the second source IP address and port combination. If the same configurable IPv4/IPv6 subnet value is not present in the first media packet and the second media packet, the media device can determine if the second IP address is in a trusted category or a suspect category for source IP addresses. If the second IP address is in the trusted category, the media device relays media packets from the core network to the first endpoint on the access network using the second source IP address and port combination.

If the second IP address is not in the trusted category and if the second IP address is not in the suspect category, the media device can relay media packets from the core network to the first endpoint on the access network using the second source IP address and port combination. If the second IP address is in the suspect category, the media device can relay media packets from the core network to the first endpoint on the access network using a third source IP address and port combination of a third media packet received on the second IP address and port combination. The third media packet can be a packet of the plurality of media packets received on the second IP address and port combination during phase two. The third media packet has a third IP address that is not in the suspect category.

In certain embodiments, the media device can receive a plurality of media packets on the second IP address and port combination. The plurality of media packets can include the second media packet from the second endpoint. The media device can categorize source addresses for the plurality of media packets in a trusted category or a suspect category. If the first IP address does not match the second IP address and if either (i) the second IP address is in the trusted category or (ii) the second IP address is not in the trusted category and is not in the suspect category, the media device can relay media packets from the core network to the first endpoint on the access network using the second IP address and port combination. If the first IP address does not match the second IP address and if the second IP address matches an entry in the suspect category, the media device can relay media packets from the core network to the first endpoint on the access network using a third source IP address and port combination of a third media packet received on the second IP address and port combination. The third media packet is a packet of the plurality of media packets, and the third media packet has a third IP address that is not in the suspect category.

In various embodiments, the media device can determine an amount of time for a duration of a call associated with the plurality of media packets. If the duration is shorter than a predetermined amount of time, the source addresses for the plurality of media packets can be categorized in the suspect category. If the duration is longer than a predetermined amount of time, the source addresses for the plurality of media packets are removed from the suspect category. If the duration is longer than a predetermined amount of time and the first source IP address and port combination and the second source IP address and port combination have the same configurable IPv4/IPv6 subnet value, the source addresses for the plurality of media packets can be categorized in the suspect category.

In certain embodiments, the media device can deactivate at least one port of the media device. If the media device receives at least one media packet on the deactivated port, the media device can classify the source of the at least one media packet as not trusted.

In various embodiments, the media device can receive, during a first time period, a first plurality of media packets (including the first media packet) from the first endpoint on the first IP address and port combination. The media device can receive during a second time period, a second plurality of media packets (including the second media packet) on the second IP address and port combination. The media device can compare the first time period and the second time period, and determine whether the first plurality of media packets or the second plurality of media packets are transmitted by an attacker outside the network address and port translation device.

The media device can receive a first plurality of media packets (including the first media packet) from the first endpoint on the first IP address and port combination and a second plurality of media packets (including the second media packet) on the second IP address and port combination. If (i) the time from receipt of the first media packet to receipt of the last media packet of the first plurality of media packets exceeds (ii) (a) the time from receipt of the first media packet to the UPDATE request or the reINVITE request plus (b) the time from receipt of the second media packet to receipt of the last media packet of the second plurality of media packets plus (c) the time between sending of the UPDATE request or the reINVITE request and receipt of the second media packet, then (iii) collection of the first plurality of media packets is terminated.

Media packets can be transmitted using a media transport protocol (e.g., Real Time Transport Protocol (RTP)). The IP address and port combination can be negotiated using a signaling protocol (e.g., Session Initiation Protocol (SIP) with Session Description Protocol (SDP) bodies attached).

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings.

DETAILED DESCRIPTION

Figure 1:
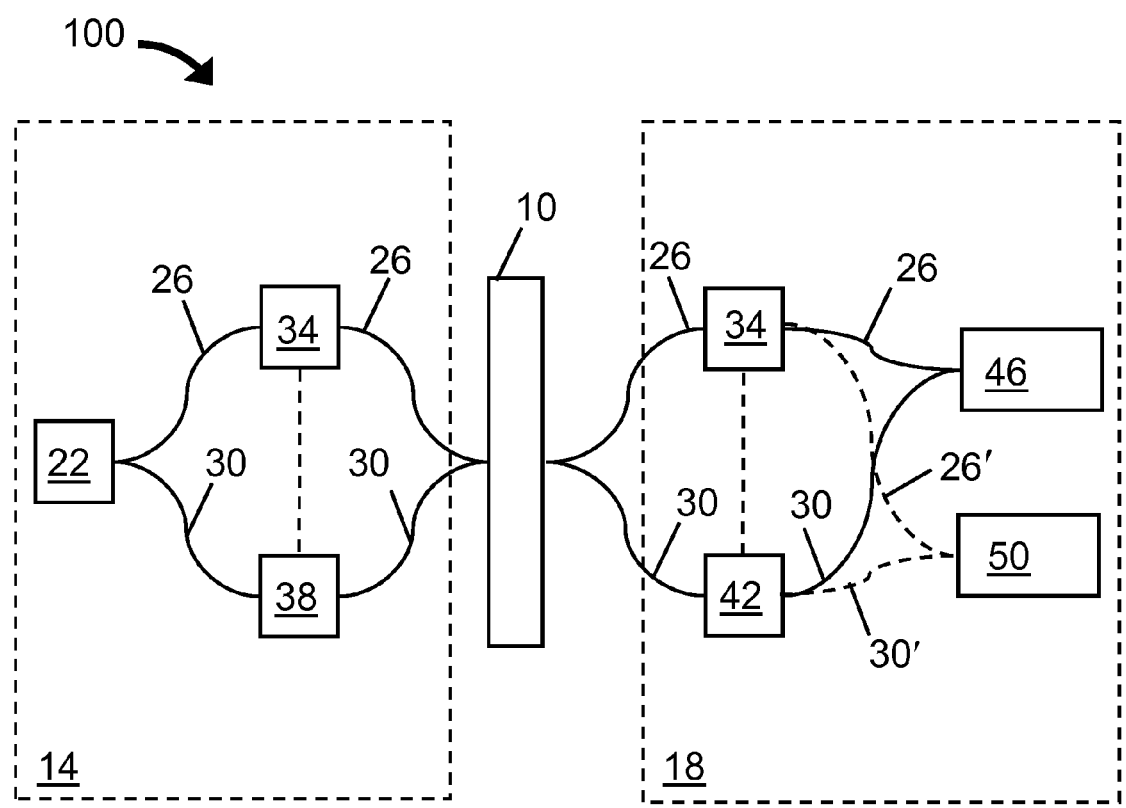
FIG. 1 is a schematic representation of a network architecture, in which the invention can be employed.

FIG. 1 shows a representation of a network architecture including a network address and port translation (NAPT) device 10 between an access network 14 and a core network 18. For the purposes of this figure, the NAPT device is considered to be part of the access network. In various embodiments, the NAPT device can be a module contained within either the access network 14 or the core network 18, or can be considered to reside on the border between the access network 14 and the core network 18.

The access network 14 can be a private IP network. The access network 14 includes an endpoint 22 in communication with the NAPT device 10 via signaling channels 26 and media channels 30. A signaling channel 26 can be formed by signaling messages that pass from the endpoint 22 to the NAPT device 10 through a media gateway controller 34 or other signaling gateway. A media channel 30 can be formed by one or more media packets that pass from the endpoint 22 to the NAPT device 10 through a media gateway 38. The media gateway controller 34 can set the parameters for the media channel 30. In certain embodiments, the media gateway controller 34 and the media gateway 38 can be combined into a single module of the access network 14.

The NAPT device 10 can act as a firewall between the two networks and can provide address and port translation for endpoint 22. The NAPT device 10 can receive media packets from the endpoint 22 and overwrite the source IP address and port combination. In certain embodiments, the NAPT device is a NAT/NAPT device.

The signaling channel 26 can use a signaling protocol or real time session protocol, such as session description protocol (SDP) or Session Initiation Protocol (SIP) with SDP bodies attached. The media channel 30 can transmit media packets using a media transport protocol, such as real time transport protocol (RTP). In a VoIP, for example, SIP can use an IP signaling channel to initiate and set the parameters for the voice stream, which is carried by RTP. The signaling channel can be used to signal the end of the call, letting the end devices know to end the RTP stream.

The core network 18 can be a public network. The core network 18 includes a media device 42 in communication with the NAPT device 10 via a media channel 30. The media device 42 can be, e.g., a media gateway. The media device 42 is in communication with another endpoint 46, to which endpoint 22 is attempting to communicate during a user session. Communication of media packets between the NAPT device 10 and the endpoint 46 can be controlled by a media gateway controller 34. In certain embodiments, media gateway controller 34 and media device 42 are combined into a single module of the core network 18.

The media device 42 can receive media packets and perform media address learning to determine the IP address and port combination of the source of the media packets. Based on the source IP address and port combination, the media device 42 knows to route packets from endpoint 46 to endpoint 22 during a user session. The media device 42 can be subject to attack by an attacker 50 on alternative signaling 26' and media 30' channels. If the media device 42 learns the IP address and port combination of the attacker 50, the media device 42 can send traffic from endpoint 46 to attacker 50, instead of to endpoint 22 via the NAPT device 10.

To thwart attackers, media device 42 can trigger a session renegotiation using an UPDATE request or a reINVITE request. Media device 42 can change the IP address and port combination over which it receives traffic from the NAPT device 10 from a first IP address and port combination to a second IP address and port combination. Only the NAPT device 10 knows the new IP address and port combination, which is different than the one used during initial session negotiation. Therefore, if attacker 50 sent traffic to the first IP address and port combination, after it had been changed, media device 42 knows to disregard it.

For example, an attacker sending packets randomly to ports possibly used for a session does not have knowledge about the signaling messages used to setup/modify/terminate a user media session. Even if an attacker sends a packet by coincidence to a port, on which the first RTP packet of a stream is waiting for NAT traversal purposes, it is unlikely that the same attacker would send a packet to a new media address negotiated for the same session. The desired endpoint can learn the new media address as it receives the signaling messages. A SIP UPDATE/reINVITE request can be used to negotiate a new media address for a session. After the new address is negotiated, the first-hop media entity waits for the first RTP packet on the new address. The endpoint can send RTP packets to the new address. An attacker likely would not send packets to the new address. The first-hop media entity can compare source addresses received on the first media address against the media addresses received at the second media address and use the address common in both groups. Comparing addresses in both groups can be of assistance when there are attacks from multiple sources. A packet from an attacking source can be received on the first address and a packet from another attacking source can be received on the other address.

In another example, certain port ranges are not used for a period of time so that information about sources used for attacking can be gathered. Some attacking sources can send packet to a large number of media addresses. Such attackers can have a higher chance to send packets to both the original and new address. As attackers would not know which port range(s) are currently in use, they would send packets to ports randomly or to all of them. Sources sending packets to ports/addresses not in use are considered to be attackers.

For example, the media device can deactivate at least one port of the media device. If the media device receives at least one media packet on the deactivated port, the media device can classify the source of the at least one media packet as not trusted.

Furthermore, a reputation list can be used to store information about sources, for which non-standard treatment is necessary. The reputation list can initially be empty or can be populated with suspect source addresses. There are two categories in the reputation list: suspect and trusted. A suspect category is used for addresses that are confirmed or likely to be used for an attack. The trusted category is used for addresses that are confirmed or likely to belong to enterprise NAT devices with multiple public IP addresses. In certain embodiments, source IP address and port combinations are categorized in the reputation list, instead of, or in addition to, the source addresses.

By utilizing IP spoofing, an attacker can make the IP address of a legitimate endpoint look like the source of an attack. This by itself is an efficient way of performing denial of service (DoS) attacks on endpoints. For that reason, sources considered as being used for attack are entered in the suspect list rather than being blacklisted. If a source in the suspect list is used for a successful call, it is removed from the suspect list. Whether a call is successful or not is determined based on the length of the call. A successful call can last more than a predetermined amount of time. This concept is used to distinguish between calls that are abandoned by a party because they could not hear anything and successful calls. Call duration can provide a hint about whether an attacker successfully managed to divert media packets.

A call party typically terminates a call if he/she does not hear anything. The concept of a successful call is used only as a hint. The mechanism does not rely on the accuracy of detecting whether a call is successful or not. Some enterprise/carrier NAT devices are using multiple IP addresses and they can assign different public IP addresses for the binding used for the initial session negotiation and for the renegotiation. Packets from the endpoint can arrive from different IP addresses even if they are legitimate. If a call is successful, the source address used after renegotiation is entered in the trusted category as this address most likely belongs to a NAT device with multiple IP addresses. An address in the trusted category can take precedence over other addresses when it comes to picking up an address.

Figure 2:
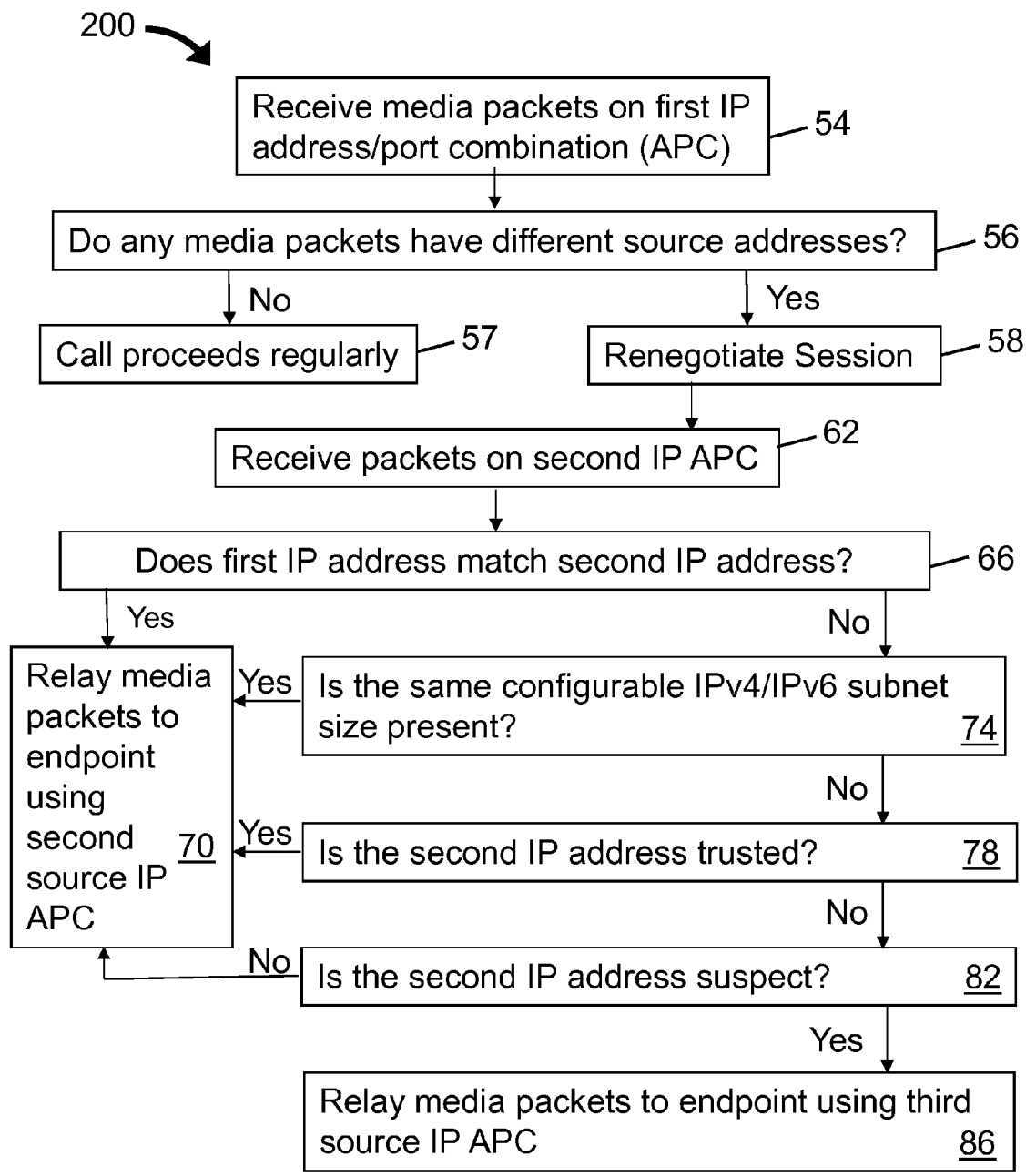
FIG. 2 is a flow diagram of a process to determine to which source IP address and port combination to relay traffic.

FIG. 2 show a flow diagram of a process to determine to which source IP address and port combination to relay traffic. The media device (e.g., media device 42) receives on a first IP address and port combination, during a user session, a plurality of media packets (including a first media packet) from a first endpoint (e.g., endpoint 22) of the access network (54). The first endpoint is behind a NAPT device. The first media packet includes a first source IP address and port combination identifying the first endpoint. The first source IP address and port combination of the first media packet can be an IP address and port combination assigned to the first endpoint by the NAPT device (e.g., the NAPT device can overwrite the source IP address and port combination of the media packet).

Receipt of media packets on the first IP address and port combination occurs during a first phase, which can be controlled by a timer. The media device can determine if any media packets in the plurality of media packets include different source address (56). If they do not, the process can terminate and the call proceeds normally (57). If two or more media packets in the plurality have different source addresses, the media device can trigger session renegotiation (58). The media device can determine if any media packets received during phase one have different source address during phase one or after phase one. The duration of phase one is configurable by a network administrator.

To renegotiate the session, the media device can transmit an UPDATE request or a reINVITE request (e.g., to the NAPT device). The UPDATE request or the reINVITE request can include the second IP address and port combination, which is different than the one used during initial session negotiation. An UPDATE request can be used if the initial INVITE transaction is complete. Otherwise, a reINVITE request can be used. The media device and the NAPT device can determine a second IP address and port combination on which the media device will receive future media packets from the first endpoint during the user session.

The media device receives, on the second IP address and port combination of the media device, during the user session, a second plurality of media packets (including a second media packet) from a second endpoint (62). The second endpoint can be endpoint 22 or an attacker 50. The second media packet includes a second source IP address and port combination identifying the second endpoint. If the endpoint 22 is the second endpoint, the second source IP address and port combination of the second media packet can be an IP address and port combination assigned to the second endpoint by the NAPT device. The NAPT device can consider the second media packet as belonging to a new flow because its destination IP address/source port is different than the first media packet.

Receipt of media packets on the second IP address and port combination occurs during a second phase. The duration of phase two is configurable by a network administrator, and can be longer, shorter or the same as the duration of phase one. Phase two can start when session renegotiation starts, or session renegotiation can occur between phase one and phase two.

The media device compares a first IP address of the first source IP address and port combination for the first media packet received on the first IP address and port combination to a second IP address for the second source address and port combination for the second media packet received on the second IP address and port combination (66). To do so, the media device can compare one or more media packets from the first plurality of media packets received on the first IP address and port combination with one or more media packets from the second plurality of media packets received on the second IP address and port combination. Comparison is between media packets received during phase one and media packets received during phase two.

If the first IP address matches the second IP address, the media device treats the user session as secure and relays media packets from the core network to the first endpoint on the access network using the second source IP address and port combination (70). Treating the user session as secure can include identifying the first endpoint and the second endpoint as the same endpoint because their source IP addresses are the same (e.g., the first and second IP addresses match). That is, the second endpoint is not attacker 50, but is instead endpoint 22, and media packets received on the first media address and port advertised by the first hop media device and on the second media address and port advertised by the first hop media device after renegotiation have the same source IP address and optionally port.

In certain embodiments, the media device compares the first source IP address and port combination for the first media packet received on the first IP address and port combination to the second source address and port combination for the second media packet received on the second IP address and port combination. If the first IP address and port combination matches the second IP address and port combination, the media device treats the user session as secure.

If the first and second IP addresses do not match or if the first source IP address and port combination does not match the second source IP address and port combination, the media device determines if the same configurable IPv4/IPv6 subnet value (e.g., the same/24 subnet) is present in the first media packet and the second media packet (74). If it is, the media device relays media packets from the core network to the first endpoint on the access network using the second source IP address and port combination (70). If the same configurable IPv4/IPv6 subnet value is not present in the first media packet and the second media packet, the media device can determine if the second IP address is in a trusted category or a suspect category for source IP addresses (78). If the second IP address is in the trusted category, the media device relays media packets from the core network to the first endpoint on the access network using the second source IP address and port combination (70).

If the second IP address is not in the trusted category, the media device can determine if the second IP address is in the suspect category (82). If the second IP address is not in the trusted category and if the second IP address is not in the suspect category, the media device can relay media packets from the core network to the first endpoint on the access network using the second source IP address and port combination (70). If the second IP address is in the suspect category, the media device can relay media packets from the core network to the first endpoint on the access network using a third source IP address and port combination of a third media packet received on the second IP address and port combination (86). The third media packet can be a packet of the plurality of media packets received on the second IP address and port combination during phase two. The third media packet has a third IP address that is not in the suspect category.

In certain embodiments, the second media packet is one packet of the plurality of media packets received on the second IP address and port combination during phase two. It may be the case that more than one packet in the plurality of media packets can have an IP address in the trusted category. The media device can select the source IP address and port combination of one of the media packets of the plurality of media packets, and can direct media packets to the endpoint using the selected source IP address and port combination. The media device can be configured to select the source IP address and port\combination of the first media packet in the trusted category, the nth media packet in the trusted category, or the last media packet in the trusted category, or to randomly select any media packet.

It may be the case that none of the packets in the plurality of media packets has an IP address in the trusted category. The media device can eliminate any media packet having an IP address in the suspect category, if any. The media device can select the source IP address and port combination of one of the remaining media packets, and can direct media packets to the endpoint using the selected source IP address and port combination. The media device can be configured to select the source IP address and port combination of the first media packet, the nth media packet, or the last media packet of the remaining media packets, or to randomly select a media packet.

If all of IP addresses are in the suspect category, the media device can be configured to select the source IP address and port combination of the first media packet, the nth media packet, or the last media packet of the media packets, or to randomly select a media packet.

Depending on system limits, it is possible to keep a fixed length reputation list, where for each category only a fixed number of addresses can be stored. In such an implementation, a counter is associated with each address present in the list. The last update time for each address is also kept. This counter is incremented whenever the same address is qualified to be put to the same category. If a new address is to be added to a category and if there are no empty slots, the address with the lowest count and earliest addition time is deleted and the new address is added.

The suspect list can be populated independent of calls. For random durations and random port ranges, certain port ranges are not used when advertising media addresses by the first-hop media device. Source addresses of the packets received on the ranges not in use are entered to suspect list.

In certain embodiments, source IP address and port combinations are categorized in the reputation list, instead of, or in addition to, the source addresses. In these embodiments, the source IP address and port combination is compared to entries in the trusted or suspect categories using the process described above.

Source addresses and/or source IP address and port combinations can be classified based on duration of a call. The media device can determine an amount of time for a duration of a call associated with the plurality of media packets. If the duration is shorter than a predetermined amount of time, the source addresses for the plurality of media packets can be categorized in the suspect category. Typically, the duration is about 5 seconds, 10 second, or 15 seconds, although longer, shorter or intermediate durations can be used. If the duration is longer than a predetermined amount of time, the source addresses for the plurality of media packets are removed from the suspect category. If the duration is longer than a predetermined amount of time and the first source IP address and port combination and the second source IP address and port combination have the same configurable IPv4/IPv6 subnet value, the source addresses for the plurality of media packets can be categorized as suspect.

The media device can receive, during a first time period, a first plurality of media packets (including the first media packet) from the first endpoint on the first IP address and port combination. The media device can receive during a second time period, a second plurality of media packets (including the second media packet) on the second IP address and port combination. The media device can compare the first time period and the second time period, and determine whether the first plurality of media packets or the second plurality of media packets are transmitted by an attacker outside the network address and port translation device. For example, if (i) the time from receipt of the first media packet to receipt of the last media packet of the first plurality of media packets exceeds (ii) (a) the time from receipt of the first media packet to the UPDATE request or the reINVITE request plus (b) the time from receipt of the second media packet to receipt of the last media packet of the second plurality of media packets plus (c) the time between sending of the UPDATE request or the reINVITE request and receipt of the second media packet, then (iii) collection of the first plurality of media packets is terminated.

If SIP forking is a possibility, only other addresses in the second group are entered in the suspect category. The other addresses can includes any or all of the phase two addresses not picked by the algorithm. If SIP forking is not possible, other addresses in the first group are entered in the suspect category. If a call is unsuccessful, the used source address is entered in the suspect category. If the call is successful and if the source address was in the suspect category, the source address can be removed from the suspect category.

In some embodiments, the media device can determine if the call is successful. If it is not, the source IP address or the source IP address and port combination used as a destination media address can be moved to the suspect category. If the call is successful, and if the source IP address or the source IP address and port combination used as the destination media address was in suspect category, the address or combination can be removed from the suspect category. If the address or combination is not in any category, it can be moved to the trusted category. The source IP address or the source IP address and port combination of other packets received in phase two can be categorized as suspect.

If SIP forking is not a possibility, and if the source IP/port destination media address was decided based on a direct match between source IP and optionally port match between two packets received in phase one and phase two (e.g., not based on subnet matching or based on a packet received in phase two being in the trusted category or based on a packet received in phase two not being in the suspect category), the source IP and optionally port for non-matching packets received in phase one can be moved to the suspect category.

Figure 3:
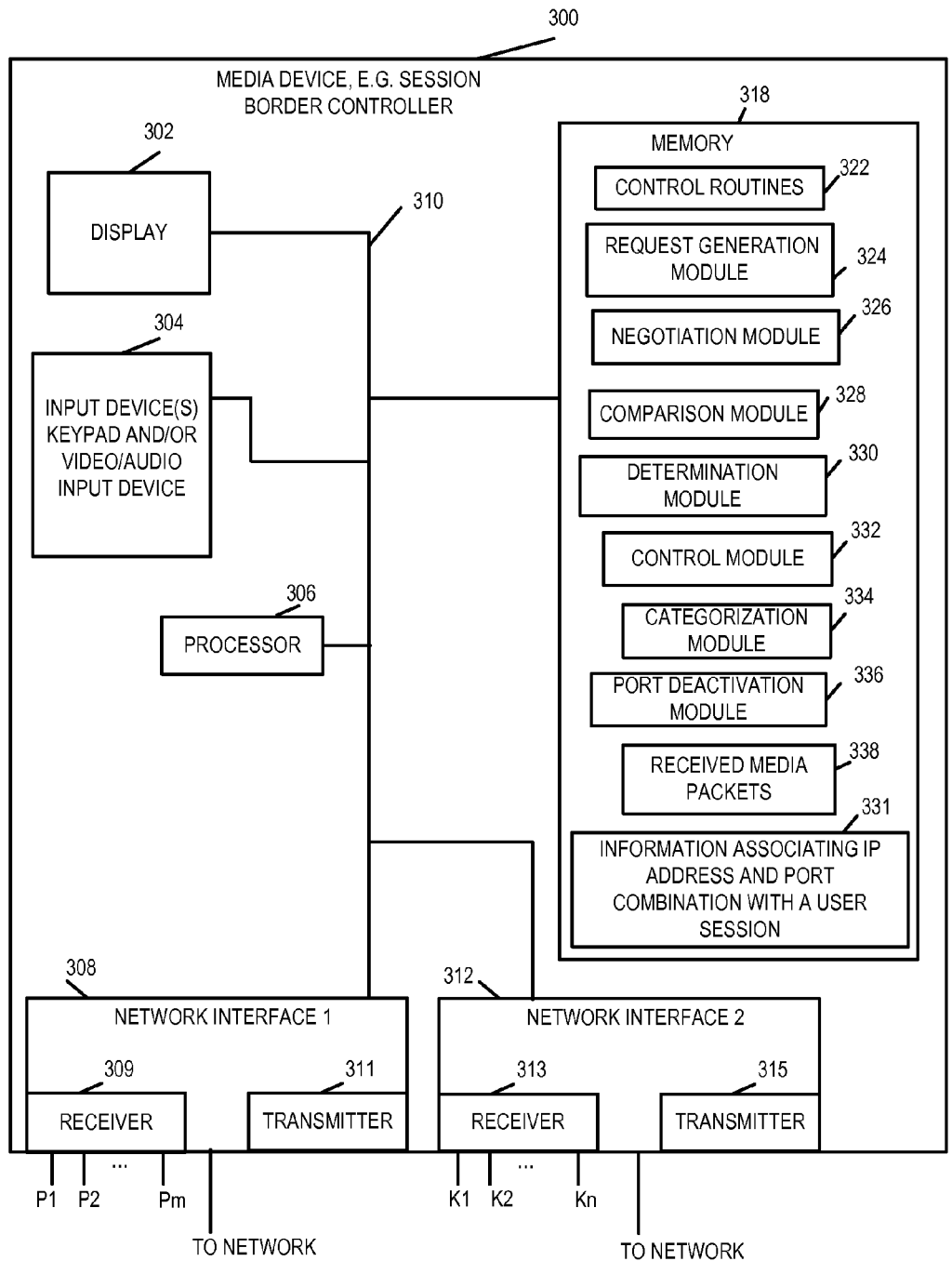
FIG. 3 is an exemplary media device, e.g., session boarder controller, implemented in accordance with one exemplary embodiment.

FIG. 3 illustrates an exemplary media device 300 e.g., a session boarder controller, implemented in accordance with one exemplary embodiment of the invention. Exemplary media device 300 is, e.g., the media device 42 of FIG. 1. Exemplary media device 300 includes a display 302, input device(s) 304, e.g., keypad, mouse, and/or video/audio input device, a processor 306, network interfaces 308, 312 and a memory 318 coupled together via a bus 310 over which the various elements may interchange data and information. Memory 318 includes routines 322 and a plurality of modules. The processor 306, e.g., a CPU, may execute the routines 322 and use the modules included in memory 412 to implement various steps of an exemplary process, e.g., various steps of method of flowchart of FIG. 2.

The network interfaces 308 and 312, each include a transmitter and a receiver. Network interface 1 308 includes a transmitter 311 and a receiver 309. In some embodiments, the receiver 309 includes a plurality of ports P1 through Pm, each port being associated with an IP address. Thus there exist a port and IP address combination corresponding to each port. Different ports can be associated with different IP addresses. Similarly, network interface 2 312 includes a transmitter 315 and a receiver 313. In some embodiments, the receiver 313 includes a plurality of ports K1 through Kn, each port being associated with an IP address. Different ports can be associated with different IP addresses. Various media packets are received by the media device via the ports on the receiver(s).

Modules in memory 318 include a request generation module 324, a negotiation module 326, a comparison module 328, a determination module 330, a control module 332, a categorization module 334, a port deactivation module. The memory 318 further includes received media packets 338. The modules perform functions corresponding to the similarly named steps of the method(s) of the invention.

The receivers 309, 313 are for receiving media packets. In some embodiments the receiver 309 receives, on a first IP address and port combination of the media device 300, during a user session, a first media packet from a first endpoint, said first endpoint being located on an access network behind a network address and port translation (NAPT) device of the access network, said first media packet including a first source IP address and port combination identifying the first endpoint. Multiple media sessions may be supported at the same time with one or more different media sessions using different IP and port combinations for communications purposes.

The negotiation module 326 is configured to negotiate, during the user session, a second IP address and port combination for the media device to receive future media packets from the first endpoint during said user session. In various embodiments the receiver 309 is further configured to receive on the second IP address and port combination of the media device, during the user session, a second media packet from a second endpoint, the second media packet including a second source IP address and port combination identifying the second endpoint.

The request generation module 324 is configured to generate an UPDATE request or a reINVITE request corresponding to a user session having a first endpoint that uses a first IP address and port combination of the media device as part of the user session. In various embodiments the generated UPDATE request or reINVITE request is transmitted, e.g., using one of the transmitter(s) 311, 315. The comparison module 328 is configured to compare a first IP address of the first source IP address and port combination address and port to a second IP address of the second source address and port combination for the second media packet received on the second IP address and port combination. The determination module 330 is configured to determine and decide an action to be taken based on the result of the comparison performed by the comparison module 328. In various embodiments, information 331 associating said first IP address and port combination with the user session is stored in memory 318. In various embodiments the UPDATE request or the reINVITE request includes the second IP address and port combination.

The control module 332 controls one or more elements of the media device 300 to perform different functions and take action in accordance with the determination and/or decision made by the determination module 330. In some embodiments if the first IP address matches the second IP address, the control module 332 controls the media device 300 to relay the second media packet from the core network to the first endpoint on the access network using the second source IP address and port combination. In some embodiments the first and second media packets each include a session identifier corresponding to said user session, the session identifier in the first and second media packets being the same. In various embodiments the first packet is one of a first plurality of received packets corresponding to the user session and the second packet is one of a second plurality of received packets corresponding to said user session.

In some embodiments if the first IP address does not match the second IP address, the determination module determines if the first media packet and the second media packet include the same configurable IPv4 subnet value or IPv6 subnet value. If the same configurable IPv4 subnet value or IPv6 subnet value is present in both the first media packet and the second media packet, the control module 332 controls the media device 300 to relay media packets from the core network to the first endpoint on the access network using the second source IP address and port combination.

In some embodiments if a same configurable IPv4 subnet value or the IPv6 subnet value is not present in the first media packet and the second media packet, the determination module 330 determines if the second IP address is in a trusted category or a suspect category for source IP addresses, and if the second IP address is in the trusted category, the control module 332 controls the media device 300 to relay media packets from the core network to the first endpoint on the access network using the second source IP address and port combination. If the determination module 330 determines that the second IP address is not in the trusted category and if the second IP address is not in the suspect category, the control module 332 controls the media device 300 to relay media packets from the core network to the first endpoint on the access network using the second source IP address and port combination.

In some embodiments if the determination module 330 determines that the second IP address is in the suspect category, the control module 332 controls the media device 300 to relay media packets from the core network to the first endpoint on the access network using a third source IP address and port combination of a third media packet received on the second IP address and port combination.

Media packets corresponding to the user session, e.g., first and second media packets, include in at least some embodiments a session identifier corresponding to the user session. Thus, media packets corresponding to the user session include the same session identifier in at least some embodiments.

The categorization module 334 is configured to categorize source addresses for a plurality of received media packets in a trusted category or a suspect category. The plurality of media packets being received by the media device on the second IP address and port combination, the plurality of media packets including the second media packet from the second endpoint.

In some embodiments, if the first source IP address and port combination does not match the second source IP address and port combination and if either (i) the second IP address is in the trusted category or (ii) the second IP address is not in the trusted category and is not in the suspect category, the control module 332 is configured to control the media device between the core network and the access network, to relay media packets from the core network to the first endpoint on the access network using the second IP address and port combination.

In some embodiments if the first IP address does not match the second IP address and if the second IP address matches an entry in the suspect category, the control module 332 is configured to control the media device between the core network and the access network, to relay media packets from the core network to the first endpoint on the access network using a third source IP address and port combination of a third media packet received on the second IP address and port combination, wherein the third media packet is a packet of the plurality of media packets and the third media packet has a third IP address that is not in the suspect category.

The port deactivation module 336 is configured to deactivate at least one port of the media device 300, e.g., in response to detecting suspect activity on the port. In some embodiments the media device 300 receives at least one media packet on the deactivated port. In some such embodiments the media device classifies the source of the at least one media packet received on the deactivated port as not trusted and stores information indicating that the source is not trusted. The information can be used to investigate and identify the source of packets which are not trustworthy, e.g., from an illegitimate source.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry, e.g., one or more circuits, that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

The following discussion facilitates a better understanding of various embodiments and features relating to at least some, but not necessarily all, embodiments.

In accordance with one aspect of the invention, following concepts are used in some but not necessarily all embodiments:

(a) Triggering a session renegotiation with an UPDATE/reINVITE request.

Consider a scenario where an attacker is sending packets randomly to ports possibly used for a session. The attacker does not have knowledge about the signaling messages used to setup/modify/terminate media sessions. So, even if an attacker sends a packet by coincidence to a port, on which a first RTP packet of a stream is waited for NAT traversal purposes, it is very unlikely that the same attacker would send a packet to a new media address negotiated for the same session. On the other hand the endpoint would learn the new media address as it receives the signaling messages. Thus it should be appreciated that an SIP UPDATE/reINVITE request can be used to negotiate a new media address for a session, thereby decreasing the chances for an attacker to send packets to the newly negotiated media address for the session and thus increasing the security of the session. After the new address is negotiated, first-hop media entity would start waiting for the first RTP packet on the new address. Endpoint would send RTP packets to the new address. The attacker most likely wouldn't send packets to the new address. In one embodiment the first-hop media entity compares source addresses received on the first media address against the media addresses received at the second media address and uses the address common in both groups. Comparing addresses in both groups helps for the cases where there is an attack from multiple sources. A packet from an attacking source can be received on the first address and a packet from another attacking source can be received on the other address.

(b) Not using certain port ranges for a period of time to gather information about sources used for attacking.

Some attacking sources may have the capability to send packet to a large number of media addresses. Such attackers could have a higher chance to send packets to both the first and second addresses described above in section a). As attackers wouldn't know which port ranges are currently in use, they would send packets to ports randomly and/or to all of the ports. Thus one way to identify sources which are used for attacking is to determine the sources which are randomly sending packets to one or a plurality of ports which are not currently in use. Accordingly, sources sending packets to ports/addresses currently not in use would be considered as being used for attack.

c) A reputation list is maintained, to store information about sources, for which non-standard treatment is necessary.

The reputation list is initially empty. The reputation list includes two categories: suspect and trusted. Suspect category is used for addresses, which most probably are used for an attack. Trusted category is used for addresses, which likely are belonging to enterprise NAT devices with multiple public IP addresses.

By utilizing IP spoofing, an attacker can make the IP address of a legitimate endpoint look like the source of an attack. This by itself is an efficient way of performing DoS attack on endpoints. For that reason, sources considered as being used for attack are included in a suspect list rather than being blacklisted. If a source in the suspect list is used for a successful call, it may be, and in some embodiments is, removed from the suspect list. Whether a call is successful or not is determined based on the length of the call. It is assumed that a call party would terminate the call if the party does not hear anything. The concept of a successful call is used just as a hint, i.e. the mechanism does not rely on the accuracy of detecting whether a call is successful or not.

Some enterprise/carrier NAT devices may be using multiple IP addresses and they can assign different public IP addresses for the binding used for the initial session negotiation and for the renegotiation described in section a). This would result that packets from the endpoint will be arriving from different IP addresses even if they are legitimate. If a call is successful, the source address used after renegotiation will be included in the trusted category as this address most likely belongs to a NAT device with multiple IP addresses.

In various embodiments an address in trusted category will have precedence over other addresses when it comes to picking up an address.

Some of the terms that are used for explanation of an exemplary procedure discussed further below are described below:

The first group addresses are the source addresses of the packets received on the IP Address and port advertised by the first-hop media device during the initial session negotiation.

The second group addresses are the source addresses of the packets received on the IP Address and port advertised by the first-hop media device during the second session negotiation, which is performed with reINVITE.

Successful call: A call, which lasts more than, e.g., a preconfigured amount of time. This concept is used to distinguish between calls, which are abandoned by a party because the party couldn't hear anything. It is impossible to make such a classification just based on call duration. The call duration provides a hint about whether an attacker successfully managed to divert media packets.

Special care may, and in some embodiments is, taken for cases, where SIP level forking is possible. With forking, it is possible that legitimate RTP packets are received from multiple sources on the initial IP Address and port advertised by the first-hop media device.

Timers used for an exemplary process in accordance with some embodiments are illustrated below:

| T1 | |
| --- | --- |
| Receipt of first packet on the initially advertised port | End of source address collection for first group |
| T2 | |
| Receipt of first packet received on the initially advertised port | reINVITE send time |
| T3 | |
| Receipt of first packet on the second port advertised with reINVITE | End of source address collection for second group |

T1, T2, T3 values are independent of each other but if, T1>T2+T3+time between sending of reINVITE and receipt of the first packet on the second port, then first group address collection stops, in some embodiments, at that moment immediately.

Various steps of an exemplary process in accordance with some embodiments are discussed below:

A) Picking the Remote End Media Address:

i- If Media Address learning is to be applied for calls, e.g., voice user sessions, for which packets from multiple sources are received during T1, after packets on the first media address are received, an UPDATE/reINVITE is issued by the first-hop media entity, where the IP address and port advertised is different than IP address and port pair used for the original session negotiation. UPDATE is used if this situation happens before the initial INVITE transaction is completed. Either UPDATE/reINVITE can be used after initial INVITE transaction is completed. The media address of the peer/endpoint is learned according to the following steps.

ii- If the same address is present in both the first group and the second group, use it. If the same address is not present in both groups, choose the address to use according to step iii-.

iii- If an address of the same/24 subnet is present in both groups, select that address. If there are no such addresses, choose the address according to step iv-.

iv- If there is an address in the second group, which is in the trusted category, select it. If there is no such address, proceed to step v-.

v- Select the first address received in the second group.

vi- When selecting an address, refrain from selecting an address in the suspect list. Select such an address only if none of the addresses match the criteria discussed in steps ii-, iii-, iv-, and v-.

vii- If SIP forking is a possibility, put other addresses in the second group to suspect category in the reputation list. If SIP forking is not possible, also include other addresses in the first group to the suspect category. If the call is unsuccessful, put the used source address to the suspect category. If the call is successful and if the source address was in the suspect category, remove the source address from the suspect category. If the address was selected according to step iii- or v-, i.e. the same address was not present in both groups and the address is not currently in the trusted category, add address to trusted category.

The order of priorities for each group, when selecting addresses may change depending on characteristics of a particular deployment scenario. On certain cases, certain types of addresses may not be eligible at all, e.g. if it is known that all endpoints/peers are behind NAT devices with a single IP address, eligible addresses would be the ones, which are present both in the first and the second group.

Depending on the system limits, in some embodiments it is possible to keep a fixed length reputation list, where for each category a limited fixed number of addresses can be stored. In such implementations, a counter is associated with each address included in the list. The last update time for each address is also maintained. This counter is incremented, whenever the same address is qualified to be put to the same category. If a new address is to be added to a category and if there are no empty slots, the address with the lowest count and earliest addition time is deleted and the new address is added.

B) Populating Suspect List Independent of Calls:

i- For random durations and random port ranges, don't use certain port ranges, when advertising media addresses in the first-hop media device. Put source addresses of the packets received on the ports under the port ranges, which are not in use, to the suspect list.

Various features of the invention prevent attackers direct media packets to themselves. This is one advantage over the known techniques such as, e.g., vanilla media address learning. Various other mechanisms, which could be considered for security check and the Some other advantages of some of the features of the invention over other techniques include:

i- RTCP packets have a CNAME field to identify the originator. This field may be used to verify the identity of the originator. On the other hand, use of RTCP from endpoints is not common and it is not guaranteed that the identity in CNAME field is FQDN (fully qualified domain name)-line rather than an IP Address. An IP Address in CNAME wouldn't be very useful.

ii- SRTP could be a solution if keys are exchanged via signaling. An attacker wouldn't know the keys and packets sent by the attacker would be dropped. Without SRTP between endpoint and first-hop media entity, this method can't be used. Various features of the invention reduce the risk associated with the security problem without relying on any special behavior/support for non-common procedures/protocols on the endpoint/B2BUA.

An exemplary method of operating a media device, in accordance with some embodiments, comprises: transmitting an UPDATE request or a reINVITE request corresponding to a user session having a first endpoint that uses a first IP address and port combination of the media device as part of said user session; negotiating, during the user session, a second IP address and port combination for the media device to receive future media packets from the first endpoint during said user session; receiving on the second IP address and port combination of the media device, during the user session, a second media packet from a second endpoint, the second media packet including a second source IP address and port combination identifying the second endpoint; comparing a first IP address of the first source IP address and port combination address and port to a second IP address of the second source address and port combination for the second media packet received on the second IP address and port combination; and taking an action based on the result of said comparing.

In some embodiments the media device is located between a core network and an access network, and the method further comprises receiving, prior to transmitting said UPDATE request or said reINVITE request, on a first IP address and port combination of the media device, during said user session, a first media packet from said first endpoint, said first endpoint being located on said access network behind a network address and port translation (NAPT) device of the access network, said first media packet including a first source IP address and port combination identifying the first endpoint.

In some embodiments, the method further includes: storing, in memory included in the media device, information associating said first IP address and port combination with said user session. In some embodiments taking an action based on the result of comparing includes, if the first IP address matches the second IP address, relaying the second media packet from the core network to the first endpoint on the access network using the second source IP address and port combination.

In some embodiments the first and second media packets each include a session identifier corresponding to said user session, the session identifier in the first and second media packets being the same. In some embodiments the media device is a session boarder controller. In some embodiments the first endpoint is one of a end user device at an end user location or an IP PBX (Internet Protocol Private Branch Exchange).

In some embodiments the user session is one of a video session, an audio session or a multimedia session. In some embodiments the first packet is one of a first plurality of received packets corresponding to said user session and said second packet is one of a second plurality of received packets corresponding to said user session. In some embodiments said first and second endpoints are the same when said session is secure. In some embodiments the UPDATE request or the reINVITE request includes the second IP address and port combination.

In some embodiments the method further comprises: treating the user session as secure by identifying the first endpoint and the second endpoint as the same endpoint when the first IP address matches the second IP address.

In some embodiments the first source IP address and port combination of the first media packet is an IP address and port combination assigned to the first endpoint by the NAPT device.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware. In some embodiments the modules are implemented fully in hardware, e.g., circuits.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope. The methods and apparatus may be, and in various embodiments are, used with various types of communications techniques which may be used to provide communications links between communications devices. In various embodiments end user device are implemented as fixed or mobile nodes and include, depending on the embodiment, notebook computers, personal data assistants (PDAs), or other portable devices including receiver/transmitter circuits and logic and/or routines, for acting as endpoints for user sessions.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method of operating a media device, comprising:
transmitting an UPDATE request or a reINVITE request corresponding to a user session having a first endpoint that uses a first IP address and port combination of the media device as part of said user session;
negotiating, during the user session, a second IP address and port combination for the media device to receive future media packets from the first endpoint during said user session;
receiving on the second IP address and port combination of the media device, during the user session, a second media packet from a second endpoint, the second media packet including a second source IP address and port combination identifying the second endpoint;
comparing a first IP address of a first source IP address and port combination to a second IP address of the second source IP address and port combination for the second media packet received on the second IP address and port combination; and taking an action based on the result of said comparing.

2. The method of claim 1, wherein said media device is located between a core network and an access network, the method further comprising:

receiving, prior to transmitting said UPDATE request or said reINVITE request, on a first IP address and port combination of the media device, during said user session, a first media packet from said first endpoint, said first endpoint being located on said access network behind a network address and port translation (NAPT) device of the access network, said first media packet including said first source IP address and port combination identifying the first endpoint.

3. The method of claim 2, further comprising:

storing, in memory included in said media device, information associating said first IP address and port combination with said user session.

4. The method of claim 2, wherein taking an action based on the result of said comparing includes, if the first IP address matches the second IP address, relaying the second media packet from the core network to the first endpoint on the access network using the second source IP address and port combination.

5. The method of claim 2, wherein the first source IP address and port combination of the first media packet is an IP address and port combination assigned to the first endpoint by the NAPT device.

6. The method of claim 2, further comprising:

if the first IP address does not match the second IP address, determining, by the media device between the core network and the access network, if the first media packet and the second media packet include the same configurable IPv4 subnet value or IPv6 subnet value; and if the same configurable IPv4 subnet value or IPv6 subnet value is present in both the first media packet and the second media packet, relaying media packets from the core network to the first endpoint on the access network using the second source IP address and port combination.

7. The method of claim 6, further comprising:

if a same configurable IPv4 subnet value or the IPv6 subnet value is not present in the first media packet and the second media packet, determining, by the media device between the core network and the access network, if the second IP address is in a trusted category or a suspect category for source IP addresses; and if the second IP address is in the trusted category, relaying, by the media device, media packets from the core network to the first endpoint on the access network using the second source IP address and port combination.

8. The method of claim 7, further comprising:

if the second IP address is not in the trusted category and if the second IP address is not in the suspect category, relaying, by the media device, media packets from the core network to the first endpoint on the access network using the second source IP address and port combination.

9. The method of claim 7, further comprising:

if the second IP address is in the suspect category, relaying, by the media device, media packets from the core network to the first endpoint on the access network using a third source IP address and port combination of a third media packet received on the second IP address and port combination.

10. The method of claim 1, further comprising:

receiving, by the media device between the core network and the access network, a plurality of media packets on the second IP address and port combination, the plurality of media packets including the second media packet from the second endpoint; and categorizing, by the media device, source addresses for the plurality of media packets in a trusted category or a suspect category.

11. The method of claim 10, further comprising:

if the first source IP address and port combination does not match the second source IP address and port combination and if either (i) the second IP address is in the trusted category or (ii) the second IP address is not in the trusted category and is not in the suspect category, relaying, by the media device between the core network and the access network, media packets from the core network to the first endpoint on the access network using the second IP address and port combination.

12. The method of claim 10, further comprising:

determining, by the media device, an amount of time for a duration of a call associated with the plurality of media packets; and if the duration is shorter than a predetermined amount of time, categorizing the source addresses for the plurality of media packets in the suspect category.

13. The method of claim 1, further comprising:

deactivating, by the media device between the core network and the access network, at least one port of the media device;

receiving, by the media device, at least one media packet on the deactivated port; and classifying, by the media device, the source of the at least one media packet received on the deactivated port as not trusted.

14. The method of claim 1, further comprising:

receiving, by the media device between the core network and the access network, during a first time period, a first plurality of media packets from the first endpoint on the first IP address and port combination, the first plurality of media packets including the first media packet;

receiving, by the media device, during a second time period, a second plurality of media packets on the second IP address and port combination, the second plurality of media packets including the second media packet;

comparing, by the media device, the first time period and the second time period; and determining, by the media device, whether the first plurality of media packets or the second plurality of media packets are transmitted by an attacker outside the network address and port translation device.

15. A media device, the media device being configured to:

transmit an UPDATE request or a reINVITE request corresponding to a user session having a first endpoint that uses a first IP address and port combination of the media device as part of said user session;

negotiate, during the user session, a second IP address and port combination for the media device to receive future media packets from the first endpoint during said user session;

receive, on the second IP address and port combination of the media device, during the user session, a second media packet from a second endpoint, the second media packet including a second source IP address and port combination identifying the second endpoint;

compare a first IP address of a first source IP address and port combination to a second IP address of the second source IP address and port combination for the second media packet received on the second IP address and port combination; and take an action based on the result of said comparing.

16. The media device of claim 15, wherein said media device is located between a core network and an access network, the media device being further configured to:

receive, prior to transmitting said UPDATE request or said reINVITE request, on a first IP address and port combination of the media device, during said user session, a first media packet from said first endpoint, said first endpoint being located on said access network behind a network address and port translation (NAPT) device of the access network, said first media packet including the first source IP address and port combination identifying the first endpoint.

17. The media device of claim 16, wherein the media device is further configured to:

store, in memory included in said media device, information associating said first IP address and port combination with said user session.

18. The media device of claim 16, wherein said media device is configured to, relay the second media packet from the core network to the first endpoint on the access network using the second source IP address and port combination, if the first IP address matches the second IP address, as part of being configured to take an action based on the result of said comparing.

19. The media device of claim 15, wherein the first source IP address and port combination of the first media packet is an IP address and port combination assigned to the first endpoint by the NAPT device.

20. A computer program product, tangibly embodied in a computer readable storage device of a media device, the computer program product including instructions which when executed by a processor cause said processor to:

transmit an UPDATE request or a reINVITE request corresponding to a user session having a first endpoint that uses a first IP address and port combination of the media device as part of said user session;

negotiate, during the user session, a second IP address and port combination for the media device to receive future media packets from the first endpoint during said user session;

receive, on the second IP address and port combination of the media device, during the user session, a second media packet from a second endpoint, the second media packet including a second source IP address and port combination identifying the second endpoint;

compare a first IP address of a first source IP address and port combination to a second IP address of the second source IP address and port combination for the second media packet received on the second IP address and port combination; and take an action based on the result of said comparing.

* * * * *